(12) United States Patent
Kamiya et al.

(10) Patent No.: US 7,979,949 B2
(45) Date of Patent: Jul. 19, 2011

(54) VEHICLE WIPER DEVICE

(75) Inventors: Jirou Kamiya, Toyohashi (JP); Tamaki Asakura, Toyohashi (JP); Nozomu Tsunekawa, Kosai (JP)

(73) Assignee: ASMO Co., Ltd. (JP)

( * ) Notice: Subject to any disclaimer, the term of this patent is extended or adjusted under 35 U.S.C. 154(b) by 614 days.

(21) Appl. No.: 12/139,058

(22) Filed: Jun. 13, 2008

(65) Prior Publication Data

US 2008/0307601 A1    Dec. 18, 2008

(30) Foreign Application Priority Data

Jun. 15, 2007   (JP) .................................. 2007-159442

(51) Int. Cl.
   *B60S 1/06*   (2006.01)
   *B60S 1/16*   (2006.01)
   *B60S 1/58*   (2006.01)
(52) U.S. Cl. .................................... 15/250.3; 15/250.31
(58) Field of Classification Search ................. 15/250.3, 15/250.31
   See application file for complete search history.

(56) References Cited

U.S. PATENT DOCUMENTS 6,240,593 B1    6/2001  Murata
6,493,900 B1 *  12/2002 Koumo et al. ............... 15/250.3
6,606,760 B1    8/2003  Koumo et al.

FOREIGN PATENT DOCUMENTS

JP           2000-233722 A     8/2000
* cited by examiner

*Primary Examiner* — Monica S Carter
*Assistant Examiner* — Stephanie Newton
(74) *Attorney, Agent, or Firm* — Joseph W. Bain; Novak Druce + Quigg LLP

(57) ABSTRACT

An actuator for rotating an oscillating disk is mounted on a rear door. A pivot shaft provided with a lever is rotatably supported on a rear door glass. The lever is provided with a first elastic portion and second elastic portions. When the rear door glass is open, the first elastic member contacts the lever between the first restrictor and the lever. As a result, the rotation of the lever toward the outside of a first angle range by a first rotational force or less is restricted. The second elastic portion contacts the lever between the first restrictor and the lever even if the lever rotates toward the outside of a second angle range by a rotational force greater than the first rotational force.

11 Claims, 6 Drawing Sheets

VEHICLE WIPER DEVICE

BACKGROUND OF THE INVENTION

The present invention relates to a vehicle wiper device. More specifically, the vehicle wiper device wipes the surface of a rear door glass which is a hatch glass.

In recent years, station wagons and hatchbacks provided with a rear door glass which is a hatch glass have been in use. The rear door glass is provided on a rear door that selectively opens and closes a luggage compartment. The rear door glass is rotatably opened and closed independently of the opening and closing of the rear door. The entire vehicle wiper device that wipes the surface of the rear door glass is sometimes directly mounted on the rear door glass.

However, an actuator of the vehicle wiper device is large and heavy among components of the vehicle wiper device. Therefore, if the actuator is mounted on the rear door glass, more operating force will be necessary to open the rear door glass. Furthermore, when closing the rear door glass, an impact caused when the rear door glass collides with the rear door is increased. As a result, a large load is applied to part of the rear door glass where the actuator is fixed, and the rear door glass might get broken. Furthermore, since a motor for driving the actuator is also mounted on the rear door glass, a structure for supplying power to the motor becomes complicated.

Therefore, Japanese Laid-Open Patent Publication No. 2000-233722 discloses a vehicle wiper device in which an actuator is fixed on a rear door, and a pivot shaft is rotatably supported on a rear door glass. The pivot shaft supports a wiper arm to rotate integrally with the pivot shaft.

The actuator rotates an oscillating disk having a coupling bore at a predetermined angle. The pivot shaft includes a lever having a coupling pin. When the rear door glass is closed, the coupling pin is inserted in the coupling bore, so that the actuator is drivingly coupled to the pivot shaft. When the oscillating disk is rotated, the lever is rotated within a rotation angle range, and as a result, the wiper arm is rotated in a reciprocating manner. When the rear door glass is open, the coupling pin is disengaged from the coupling bore. Thus, the rear door glass is easily opened and closed without hindrance.

A pivot holder supporting the pivot shaft has restrictors, which restrict the rotation of the lever beyond the rotation angle range. The restrictors prevent the wiper arm from hanging down in such a manner that the wiper blade interferes with the rear door. However, an allowance, which is created between the rotation angle range and the restrictors, accommodate component size variations and assembly variations. The allowance prevents the lever from colliding with the restrictors every time the wiper operates. Therefore, the lever might slightly deviate from the rotation angle range. In this case, the appearance of the vehicle might be spoiled.

SUMMARY OF THE INVENTION

Accordingly, it is an objective of the present invention to provide a vehicle wiper device that reliably prevents a wiper arm from hanging down.

One aspect of the present invention provides a vehicle wiper device. The vehicle wiper device wipes a surface of a hatch window, which is selectively opened and closed with respect to a vehicle body. The hatch window is selectively opened and closed by rotating with respect to the vehicle body. The device includes an actuator mounted on the vehicle body. The actuator includes an output shaft, which rotates in a reciprocating manner within a first angle range. The output shaft includes a first coupling portion. A support member is mounted on the hatch window. The support member supports a pivot shaft to be rotatable with respect to the hatch window. The pivot shaft extends through the hatch window. The pivot shaft includes a second coupling portion. When the hatch window is closed, the second coupling portion is drivingly coupled to the first coupling portion. The output shaft is arranged coaxially with the pivot shaft. The rotation of the output shaft within the first angle range rotates the second coupling portion within the first angle range. A wiper arm is supported by the pivot shaft. When the actuator is actuated while the hatch window is closed, the wiper arm oscillates to wipe the surface of the hatch window. A restrictor restricts the rotation of the second coupling portion. The restrictor restricts the rotation of the second coupling portion to the outside of the first angle range. The restrictor restricts the rotation of the second coupling portion outside of both circumferential ends of the first angle range. A first elastic member is arranged at least on one of the restrictor and the second coupling portion. When the hatch window is open, the first elastic member contacts the second coupling portion between the restrictor and the second coupling portion. Thus, even if a force less than or equal to a first rotation force acts on the second coupling portion, the second coupling portion is restricted from rotating to the outside of the first angle range. A second elastic member arranged at least on one of the restrictor and the second coupling portion. A second angle range greater than the first angle range is defined. When the hatch window is open, the second elastic member contacts the second coupling portion between the restrictor and the second coupling portion. Thus, the second elastic member restricts the rotation of the second coupling portion to the outside of the second angle range. The second elastic member restricts the rotation of the second coupling portion even if a force greater than the first rotation force acts on the second coupling portion.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE PREFERRED EMBODIMENT

FIGS. 1 to 6 show a vehicle wiper device 1 according to one embodiment of the present invention.

Figure 1:
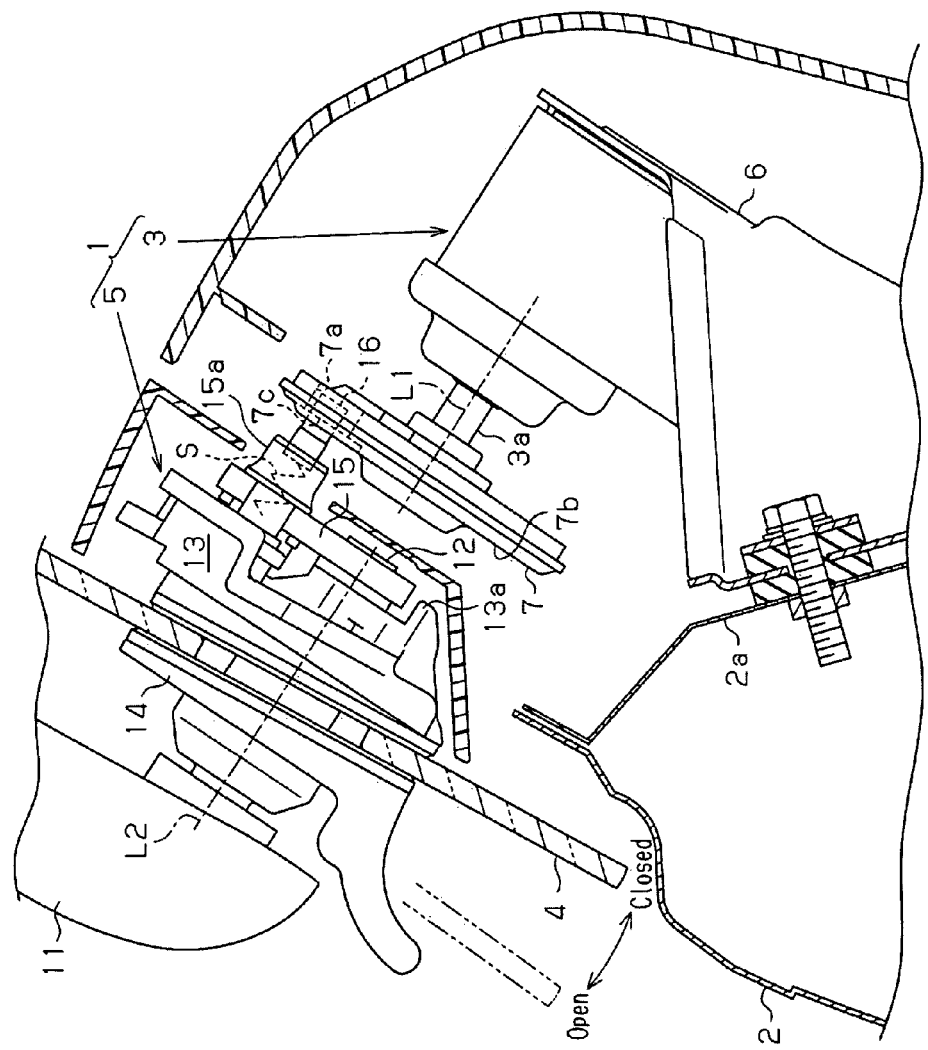
FIG. 1 is a side view illustrating a vehicle wiper device according to one embodiment of the present invention.

As shown in FIG. 1, a vehicle includes a rear door 2 and a rear door glass 4. The rear door glass 4 is a hatch window, which selectively opens and closes by rotating relative to the rear door 2. That is, the rear door glass 4 is a hatch glass. The left hand of the rear door glass 4 in FIG. 1 is the outside of a passenger compartment, and the right hand of the rear door glass 4 in FIG. 1 is the inside of the passenger compartment. The rear door 2 configuring part of a vehicle body includes an inner panel 2a located inside the passenger compartment.

FIG. 1 shows the vehicle wiper device 1, which wipes the outer surface of the rear door glass 4. The vehicle wiper device 1 includes an actuator 3 and a glass mounting unit 5. The actuator 3 is mounted on the rear door 2, and the glass mounting unit 5 is mounted on the rear door glass 4. The actuator 3 is fixed by screws to the inner panel 2a with a mounting plate 6. The actuator 3 is an electric motor, which includes an output shaft. The output shaft is a motor shaft 3a in this embodiment.

The glass mounting unit 5 includes a pivot shaft 12 and a pivot holder 13. The pivot holder 13 is secured to the rear door glass 4. The pivot holder 13 is a support member, which rotatably supports the pivot shaft 12 on the rear door glass 4. The pivot shaft 12 is disengageably coupled to the motor shaft 3a. When the rear door glass 4 is closed, the pivot shaft 12 is coupled to the motor shaft 3a. When the rear door glass 4 is open, the pivot shaft 12 is disengaged from the motor shaft 3a.

The pivot shaft 12 supports a wiper arm 11. The wiper arm 11 is provided with a wiper blade (not shown). When the rear door glass 4 is closed, the actuator 3 rotates the motor shaft 3a, so that the wiper arm 11 is rotated via the pivot shaft 12. As a result, the wiper blade wipes the surface of the rear door glass 4.

Figure 2:
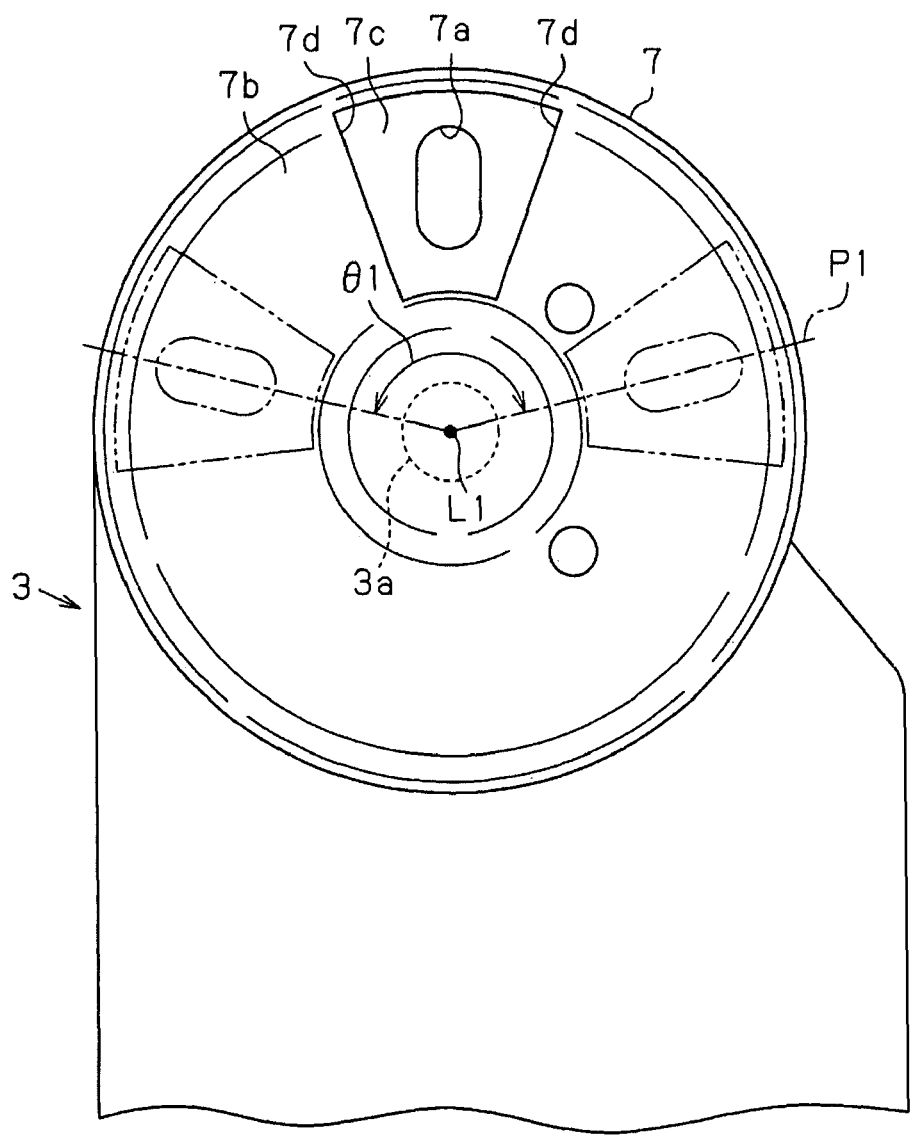
FIG. 2 is a diagram illustrating the actuator shown in FIG. 1 as viewed from the glass mounting unit.

As shown in FIGS. 1 and 2, a first coupling portion, which is an oscillating disk 7 in this embodiment, is secured to the motor shaft 3a to rotate integrally with the motor shaft 3a. As shown in FIG. 2, the actuator 3 rotates the motor shaft 3a and the oscillating disk 7 in a reciprocating manner within a first angle range θ1.

As shown in FIG. 2, the oscillating disk 7 includes a coupling bore 7a, an outer surface 7b, and a correction recess 7c. The coupling bore 7a, which extends through the oscillating disk 7, is located close to the peripheral edge of the oscillating disk 7. That is, the coupling bore 7a is radially offset with respect to a first axis L1 of the motor shaft 3a. The coupling bore 7a has an elliptic shape extending in the radial direction of the oscillating disk 7. The outer surface 7b faces the rear door glass 4. The correction recess 7c, which serves as a position correcting portion, is formed in the outer surface 7b. As viewed from the direction of the first axis L1, the correction recess 7c has a sectorial shape, and surrounds the coupling bore 7a. That is, the correction recess 7c has circumferential contact surfaces 7d on both sides of the coupling bore 7a in the circumferential direction.

As shown in FIG. 1, the pivot shaft 12 extends through the rear door glass 4. The pivot shaft 12 supports the wiper arm 11 with respect to the rear door glass 4 at the outside of the passenger compartment to rotate integrally with the pivot shaft 12. The pivot holder 13 is made of metal. The pivot holder 13 is secured to the rear door glass 4 such that a second axis L2 of the pivot shaft 12 is aligned with the first axis L1 of the motor shaft 3a when the rear door glass 4 is closed. That is, when the rear door glass is closed, the pivot shaft 12 is coaxial with the motor shaft 3a.

As shown in FIG. 1, the pivot holder 13 and a sandwiching member 14 are mounted on the rear door glass 4 by sandwiching the rear door glass 4. A second coupling portion, which is a lever 15 in this embodiment, is secured to an end of the pivot shaft 12 in the passenger compartment to rotate integrally with the pivot shaft 12. In other words, the proximal end of the lever 15 is secured to the end of the pivot shaft 12 facing the actuator 3.

FIG. 1 shows the lever 15, which is made of metal. That is, the lever 15 and the pivot holder 13 are members with high rigidity. The distal end of the lever 15 has a pin holder 15a. The pin holder 15a supports a coupling pin 16 to be movable in parallel to the second axis L2 of the pivot shaft 12. The pin holder 15a accommodates a spring S. The spring S urges the coupling pin 16 to protrude toward the actuator 3. When the rear door glass 4 is closed, the coupling pin 16 is fitted in the coupling bore 7a of the oscillating disk 7. That is, when the rear door glass 4 is closed, the oscillating disk 7 is drivingly coupled to the lever 15, and as a result, the actuator 3 is drivingly coupled to the pivot shaft 12.

Figure 3:
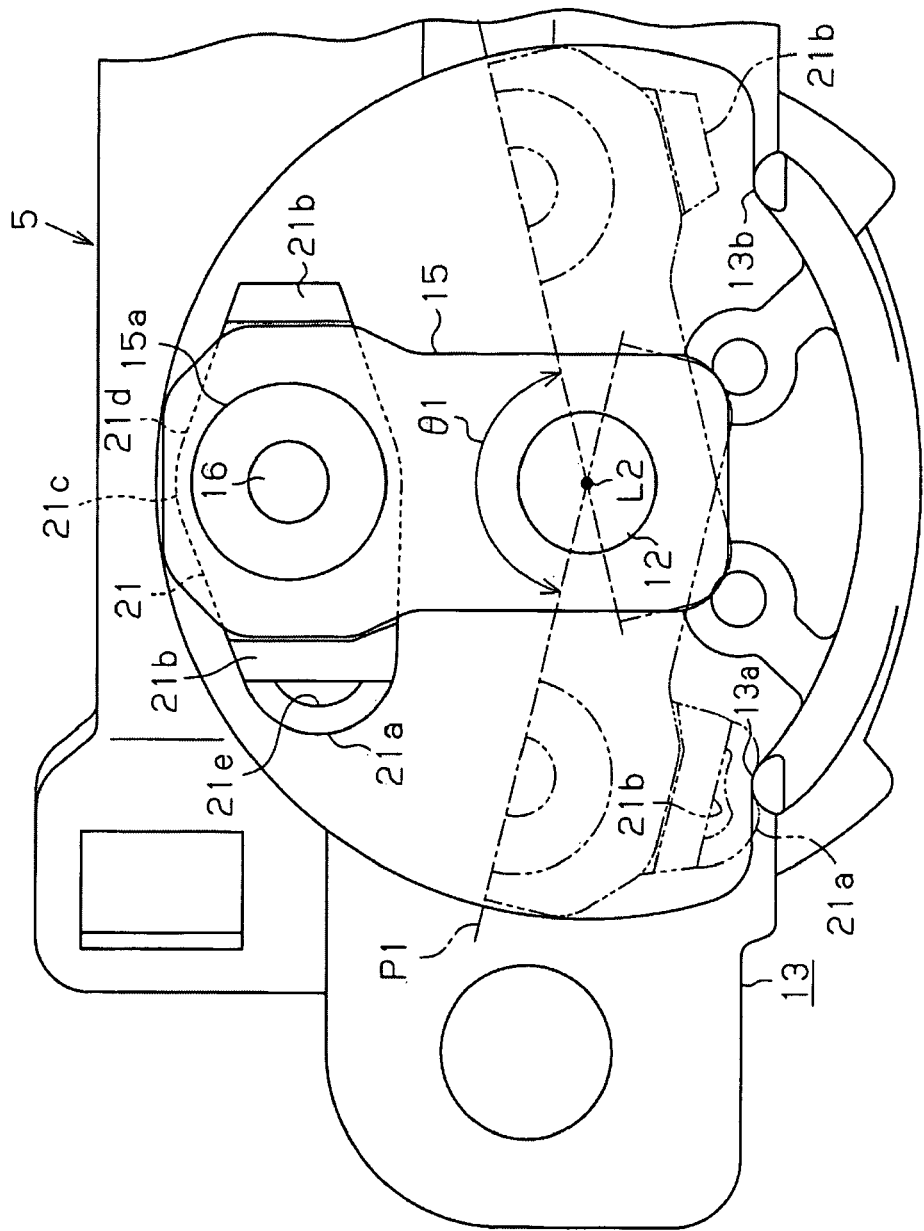
FIG. 3 is a diagram illustrating the glass mounting unit shown in FIG. 1 as viewed from the actuator.

Therefore, when the actuator 3 is actuated while the rear door glass 4 is closed, the wiper arm 11 is oscillated and wipes the rear door glass 4. As shown in FIG. 3, an oscillating angle, that is, a rotation angle of the wiper arm 11 and the lever 15 is the same as the first angle range θ1 of the motor shaft 3a. FIG. 3 shows the lever 15 located at both ends of the first angle range θ1 in chain double-dashed lines. The vehicle wiper device 1 of the preferred embodiment is actuated based on manipulation of an operating switch (not shown) provided near a driver's seat. When the operating switch is turned off by a driver, the actuator 3 automatically moves the wiper arm 11 to a stop position P1, and stops the wiper arm 11 at the stop position P1. That is, the vehicle wiper device 1 is provided with a known automatic stop function. The stop position P1 is one of the ends of the first angle range θ1.

Figure 5:
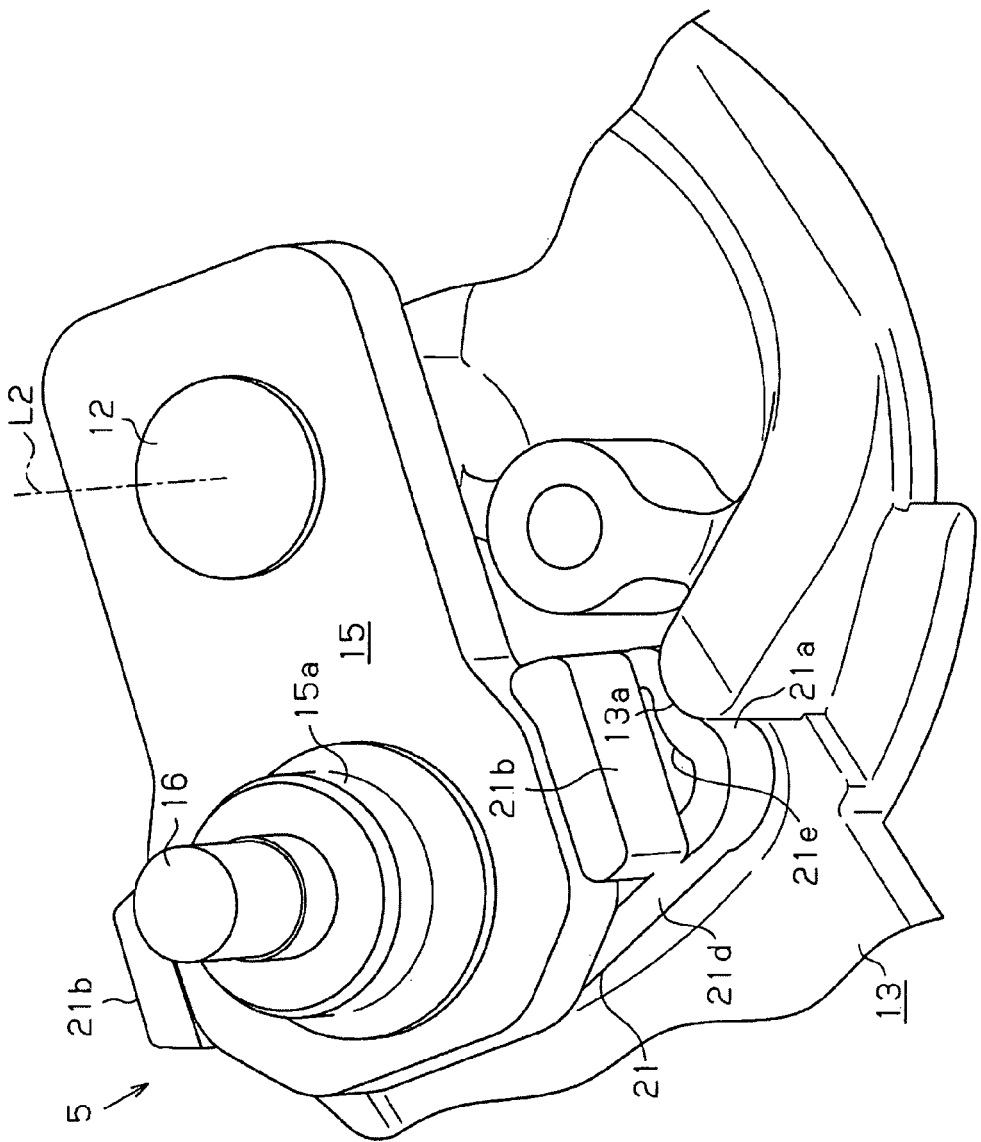
FIG. 5 is a perspective view illustrating a state where the first elastic portion of FIG. 3 abuts against the first restrictor.

As shown in FIGS. 3 and 5, the pivot holder 13 is provided with a first restrictor 13a and a second restrictor 13b. The first restrictor 13a and the second restrictor 13b abut against the lever 15 outside the first angle range θ1. That is, the first restrictor 13a and the second restrictor 13b restrict further movement of the lever 15 outside the first angle range θ1. In other words, the first restrictor 13a and the second restrictor 13b prevent the wiper blade from significantly hanging down in such a manner that the wiper arm 11 and the wiper blade interfere with the vehicle body such as the rear door 2. That is, the first and second restrictors 13a, 13b prevent the appearance of the vehicle from being significantly spoiled.

FIGS. 1 and 5 show only the first restrictor 13a. The first restrictor 13a restricts the lever 15 from rotating to the outside of the first angle range θ1 from the stop position P1. The first restrictor 13a and the second restrictor 13b extend along the second axis L2. When the lever 15 oscillates within the first angle range θ1, the first restrictor 13a and the second restrictor 13b do not contact the lever 15.

As shown in FIG. 3, an allowance is secured between the lever 15 located at the stop position P1 and the first restrictor 13a to accommodate size variations and assembly variations. The allowance prevents the lever from colliding with the restrictors every time the wiper operates. An allowance of the same size is created between the lever 15 located at the other end of the first angle range θ1 and the second restrictor 13b. That is, the first restrictor 13a and the second restrictor 13b are apart from the lever 15 located at the corresponding end of the first angle range θ1 by the same circumferential distance.

As shown in FIG. 3, a first elastic portion 21a and two second elastic portions 21b are provided at the distal end of the lever 15. The first elastic portion 21a and one of the second elastic portions 21b are arranged between the first restrictor 13a and the distal end of the lever 15 in the circumferential direction of the second axis L2. The other one of the second elastic portions 21b is arranged between the second restrictor 13b and the distal end of the lever 15. That is, the first elastic portion 21a is only located on one side of the distal end of the lever 15 in the circumferential direction about the second axis L2. The second elastic portions 21b are each located on one of the sides of the distal end of the lever 15 in the circumferential direction about the second axis L2. In this embodiment, the first elastic portion 21a, which serves as a first elastic member, and the second elastic portions 21b, which serve as second elastic members, are integrated as an elastic member 21. The elastic member 21 is mounted on the distal end of the lever 15.

Figure 4A:
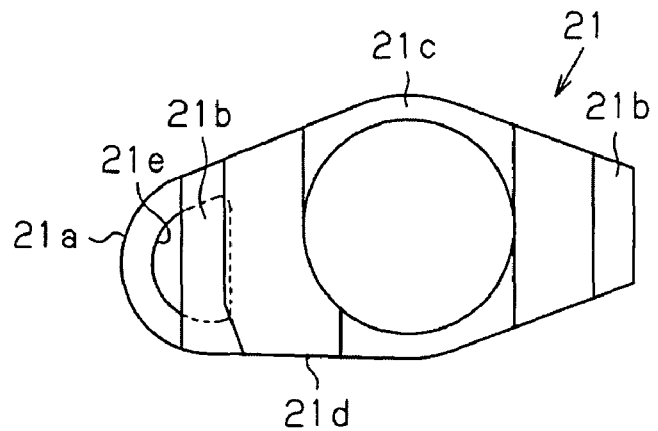
FIG. 4A is a diagram illustrating the elastic member shown in FIG. 3.
Figure 4B:
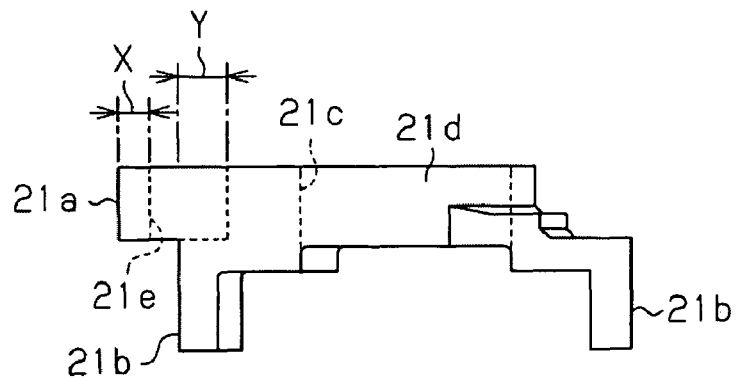
FIG. 4B is a side view illustrating the elastic member of FIG. 4A.
Figure 4C:
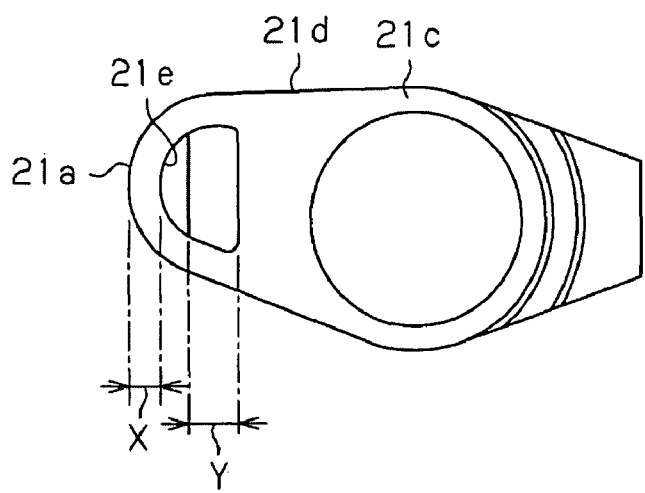
FIG. 4C is a diagram illustrating the elastic member as viewed from the direction opposite to that in FIG. 4A.

As shown in FIGS. 4A to 4C, the elastic member 21 has a base portion 21d. The first elastic portion 21a and the second elastic portions 21b are integrally formed with the base portion 21d. The base portion 21d has an annular portion 21c at the center. The pair of second elastic portions 21b are arranged to sandwich the annular portion 21c in between. That is, the pair of second elastic portions 21b and the base portion 21d form a channel.

As shown in FIGS. 3 and 5, the pin holder 15a is fitted in the annular portion 21c, so that the elastic member 21 is mounted on the distal end of the lever 15. The channel-like groove of the elastic member 21 accommodates the distal end of the lever 15. That is, the pair of second elastic portions 21b protect both sides of the distal end of the lever 15 in the circumferential direction of the second axis L2.

As shown in FIG. 4A, the first elastic portion 21a is semi-annular when not elastically deformed. That is, the first elastic portion 21a defines a semicircular hollow portion 21e. As shown in FIGS. 4A and 5, the first elastic portion 21a protrudes more than the second elastic portion 21b in the circumferential direction of the second axis L2. That is, the first elastic portion 21a is formed to protrude toward the outside of the first angle range θ1 more than the second elastic portion 21b.

As shown in FIG. 5, in the direction of the second axis L2 of the pivot shaft 12, the base portion 21d is located between the lever 15 and the pivot holder 13. That is, the lever 15 is located between the base portion 21d and the actuator 3. The second elastic portions 21b extend toward the actuator 3 from the base portion 21d. The first elastic portion 21a and the second elastic portions 21b are arranged side by side along the second axis L2 of the pivot shaft 12. In the direction of the second axis L2 of the pivot shaft 12, the first elastic portion 21a is located between the associated second elastic portion 21b and the pivot holder 13. That is, one of the second elastic portions 21b is located between the first elastic portion 21a and the actuator 3. The distance between the second axis L2 and the annular portion 21c, the distance between the second axis L2 and the first elastic portion 21a, and the distance between the second axis L2 and the second elastic portions 21b are equal to one another.

The hollow portion 21e faces the second elastic portion 21b along the direction of the second axis L2. The semi-annular portion of the first elastic portion 21a is referred to as a solid portion. As shown in FIGS. 4B and 4C, in the circumferential direction of the second axis L2, the dimension of the solid portion of the first elastic portion 21a is referred to as a first width X, and the dimension from the second elastic portion 21b to the bottom of the hollow portion 21e is referred to a second width Y. The second width Y is greater than the first width X.

The operations of the vehicle wiper device 1 will now be described.

As shown in FIGS. 3 and 5, when the lever 15 is located at the stop position P1, the first elastic portion 21a contacts the first restrictor 13a in a slightly deformed state. The first elastic portion 21a does not touch the bottom of the hollow portion 21e. The associated second elastic portion 21b is spaced apart from the first restrictor 13a. That is, the second elastic portions 21b are spaced apart from the first restrictor 13a and the second restrictor 13b when the lever 15 is located at the ends of the first angle range θ1.

As a result, even if the coupling pin 16 is removed from the coupling bore 7a when the rear door glass 4 is opened, the first elastic portion 21a abuts against the first restrictor 13a in a slightly deformed state. That is, when the wiper arm 11 is disengaged from the actuator 3, the first elastic portion 21a and the first restrictor 13a restrict the lever 15 from rotating outside of the first angle range θ1. That is, the first restrictor 13a and the first elastic portion 21a, which contact each other, restrict the wiper arm 11 from hanging down from the stop position P1 by its own weight.

The elasticity of the first elastic portion 21a is set based on the weight of the wiper arm 11. The elasticity of the first elastic portion 21a is set such that, when an external force other than the weight of the wiper arm 11 itself acts on the wiper arm 11, the first restrictor 13a enters the hollow portion 21e and abuts against the associated second elastic portion 21b. That is, the elasticity of the first elastic portion 21a is set relatively small. The hollow portion 21e helps reducing the elasticity of the first elastic portion 21a. In this manner, when the second elastic portion 21b restricts the rotation of the lever 15, the first elastic portion 21a retracts toward the second elastic portion 21b. That is, the force of the first elastic portion 21a for restricting the rotation of the lever 15 is set so as to restrict the wiper arm 11 from hanging down when no external force other than the weight of the wiper arm 11 itself is applied to the wiper arm 11. In other words, the first restrictor 13a restricts the rotation of the lever 15 toward the outside of the first angle range θ1 by a force less than or equal to a first rotational force. The first rotational force is a force that rotates the wiper arm 11 by the weight of the wiper arm 11. The state where the first elastic portion 21a cannot support the wiper arm 11 will be referred to as a state where the first elastic portion 21a is disabled.

Figure 6:
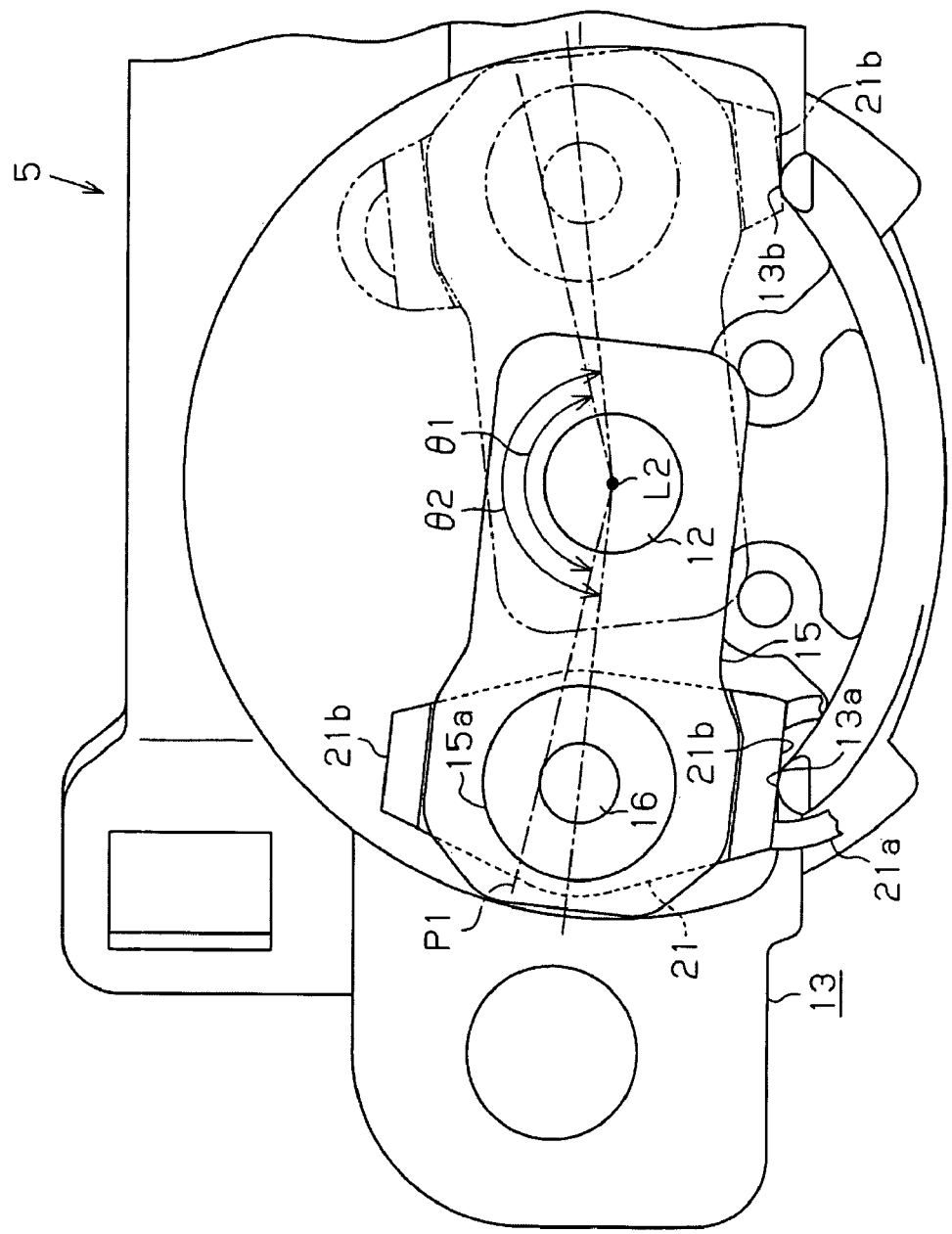
FIG. 6 is a diagram illustrating a state where the first elastic portion of FIG. 3 is broken and the second elastic portion abuts against the first restrictor.

FIG. 6 shows a state where the first elastic portion 21a is broken, and the first restrictor 13a abuts against the second elastic portion 21b. The first elastic portion 21a might break if a great external force acts on the wiper arm 11 or the first elastic portion 21a deteriorates in a state where the coupling pin 16 is removed from the coupling bore 7a. The state where the first elastic portion 21a is broken is one of disabled states of the first elastic portion 21a. In the state where the first elastic portion 21a is disabled and the rear door glass 4 is open, the second elastic portion 21b abuts against the first restrictor 13a if the lever 15 is further rotated toward the outside of the first angle range θ1 from the stop position P1. As a result, further rotation of the lever 15 is restricted, and the wiper arm 11 is prevented from hanging down.

As shown in FIG. 6, the rotation range of the lever 15 between the state where one of the second elastic portions 21b abuts against the first restrictor 13a and the state where the other second elastic portion 21b abuts against the second restrictor 13b is referred to as a second angle range θ2. The second angle range G2 is greater than the first angle range G1.

The first restrictor 13a and the second elastic portions 21b restrict the lever 15 from rotating to the outside of the second angle range θ2.

The force that the first restrictor 13a and the associated second elastic portion 21b restrict the rotation of the lever 15 is greater than the force that the first elastic portion 21a and the first restrictor 13a restrict the rotation of the lever 15. That is, the second elastic portions 21b restrict the rotation of the lever 15 toward the outside of the second angle range θ2 by a force greater than the first rotational force. Thus, the restriction of the rotation of the lever 15 by the first restrictor 13a and the associated second elastic portion 21b restricts the wiper arm 11 from hanging down even if an external force greater than the weight of the wiper arm 11 acts on the wiper arm 11. In other words, the second elastic portion 21b restricts the wiper arm 11 from hanging down even if a second rotational force that is greater than the first rotational force acts on the wiper arm 11. Thus, in the state where the first elastic portion 21a is disabled, the second elastic portions 21b prevent the lever 15 having high rigidity from directly colliding with the first restrictor 13a and the second restrictor 13b having high rigidity. That is, the first elastic portion 21a is first means to prevent the lever 15 from colliding with the first restrictor 13a, and the second elastic portion 21b is last means to prevent the lever 15 from colliding with the first restrictor 13a. The elasticity of the second elastic portions 21b is greater than the elasticity of the first elastic portion 21a. Since only the first elastic portion 21a has the hollow portion 21e, the elasticity of the second elastic portions 21b is easily set greater than the elasticity of the first elastic portion 21a.

As shown in FIG. 6, when the first restrictor 13a abuts against the associated second elastic portion 21b, the lever 15 is located outside of the first angle range θ1. That is, the lever 15 is located at one end of the second angle range θ2. In this state, when the rear door glass 4 is closed from the open state, since the coupling pin 16 is displaced from the coupling bore 7a, the coupling pin 16 retracts into the pin holder 15a and abuts against the bottom of the correction recess 7c. That is, the circumferential dimension of the correction recess 7c is set such that the coupling pin 16 is located between the two circumferential contact surfaces 7d when the lever 15 is located at either end of the second angle range θ2.

Thereafter, when the actuator 3 is rotated within the first angle range θ1, one of the circumferential contact surfaces 7d of the correction recess 7c engages with the coupling pin 16. Thus, the actuator 3 rotates the pivot shaft 12. The operation of the actuator 3 moves the coupling pin 16 of the lever 15 into the first angle range θ1. Subsequently, when the rotation of the motor shaft 3a is reversed, the coupling pin 16 is fitted in the coupling bore 7a. That is, the lever 15 is drivingly coupled to the oscillating disk 7 as normal. Thus, normal wiping operation is resumed.

The preferred embodiment has the following advantages.

(1) The lever 15 is provided with the first elastic portion 21a and the second elastic portions 21b. When the rear door glass 4 is open, the first elastic portion 21a contacts the lever 15 between the first restrictor 13a and the lever 15. As a result, the rotation of the lever 15 toward the outside of the first angle range θ1 by the first rotational force or less is restricted. This prevents the wiper arm 11 from slightly hanging down due to opening and closing of the rear door glass 4. Thus, the aesthetic appearance is prevented from being spoiled due to the hanging down of the wiper arm 11.

In this manner, the first elastic portion 21a contacts the lever 15 at one end of an oscillating range during wiping operation of the wiper arm 11, that is, at one end of the first angle range θ1. Thus, the first elastic portion 21a might get broken and disabled.

However, the second elastic portion 21b of the preferred embodiment contacts the lever 15 between the first restrictor 13a and the lever 15 even if the lever 15 rotates toward the outside of the second angle range θ2 by a rotational force greater than the first rotational force. Therefore, although the first elastic portion 21a is disabled, the lever 15 is restricted from being rotated to the outside of the second angle range θ2. This prevents the wiper arm from hanging down significantly. That is, the wiper arm 11 and the wiper blade are prevented from interfering with the vehicle body such as the rear door 2. Thus, even if the first elastic portion 21a gets broken, the aesthetic appearance of the vehicle is prevented from being spoiled significantly.

In this manner, the elastic member 21 contacts the lever 15 and restricts the rotation of the lever 15 regardless of whether the first elastic portion 21a is disabled. Therefore, the lever 15, which is a member having a high rigidity, is reliably prevented from directly colliding with the first restrictor 13a and the second restrictor 13b of the pivot holder 13, which is also the member having high rigidity. As a result, breakage of the lever 15 and the pivot holder 13 and noise caused by collision are reduced.

(2) The first elastic portion 21a and the second elastic portions 21b are integrated as the elastic member 21. Thus, as compared to a case where the first elastic portion 21a and the second elastic portions 21b are separately provided, the number of components is reduced in the preferred embodiment.

(3) The first elastic portion 21a has the hollow portion 21e. Thus, while the first elastic portion 21a and the second elastic portions 21b are integrally formed of the same material, the elasticity of the first elastic portion 21a is easily made smaller than the elasticity of the second elastic portions 21b. That is, the elasticity of the first elastic portion 21a and the second elastic portions 21b are set in a suitable manner independently. Thus, the reactive force from the first elastic portion 21a to the wiper arm 11 is easily set in a suitable manner. That is, the reactive force from the first elastic portion 21a to the wiper arm 11 is easily set such that the wiper arm 11 is prevented from hanging down and the actuator 3 does not receive a great load.

For example, the first elastic portion and the second elastic portions may be formed of the same material into the shape of a rod, and the cross-sectional area of the first elastic portion may be formed smaller than the cross-sectional area of the second elastic portions. In this case also, the elasticity of the first elastic portion is set smaller than the elasticity of the second elastic portions. However, the rod-like first elastic portion might be suddenly bent, causing the elasticity to be irregular. In this case, the reactive force is not easily stabilized. That is, the rod-like first elastic portion is not easily deformed or compressed, in a desired manner. However, since the first elastic portion 21a of the preferred embodiment is semi-annular, the first elastic portion 21a does not bend as easily as when it is in a simple rod-like shape. That is, the first elastic portion 21a of the preferred embodiment is easily deformed in a desired manner, so that a reactive force is stably applied to the lever 15 in a suitable manner.

(4) In the circumferential direction of the second axis L2, the first width X, which is the dimension of the solid part of the first elastic portion 21a, is smaller than the second width Y, which is the dimension from the associated second elastic portion 21b to the bottom of the hollow portion 21e. Thus, when the first elastic portion 21a is deformed and disabled, the hollow portion 21e accommodates the first elastic portion 21a, and as a result, the second elastic portion 21b abuts against the first restrictor 13a. Thus, for example, even if a great external force is applied to the wiper arm 11 and the first elastic portion 21a is disabled, breakage of the first elastic portion 21a is suppressed. That is, a great external force applied to the wiper arm 11 is received by the second elastic portion 21b.

(5) The first elastic portion 21a and the second elastic portions 21b are arranged side by side along the direction of the second axis L2 of the pivot shaft 12. Therefore, as compared to, for example, a case where the first elastic portion and the second elastic portions are arranged side by side in the radial direction of the second axis L2, the first elastic portion 21a and the second elastic portions 21b are arranged as far as possible from the second axis L2 of the pivot shaft 12 in the preferred embodiment. Thus, the angle accuracy of when the first elastic portion 21a and the second elastic portions 21b restrict the rotation of the lever 15 is improved as much as possible. That is, the angle accuracy of both ends of the first angle range θ1 and the angle accuracy of both ends of the second angle range θ2 are improved as much as possible.

(6) The first elastic portion 21a is provided only on one side of the distal end of the lever 15. That is, among the sides of the distal end of the lever 15, the first elastic portion 21a is provided only on the side that prevents the wiper arm 11 from hanging down from the stop position P1. Thus, for example, as compared to a case where the first elastic portion 21a is provided on both sides of the distal end of the lever 15, the preferred embodiment reduces the material costs.

(7) The oscillating disk 7 has the correction recess 7c, which defines the circumferential contact surfaces 7d surrounding the coupling bore 7a. In the case where the lever 15 is located outside the first angle range θ1 and within the second angle range θ2, rotating the motor shaft 3a within the first angle range θ1 engages one of the circumferential contact surfaces 7d with the coupling pin 16 of the lever 15. As a result, the actuator 3 rotates the pivot shaft 12. When the actuator 3 is further driven, the coupling pin 16 of the lever 15 is guided to the inside of the first angle range θ1. Therefore, even if the first elastic portion 21a gets broken, and the lever 15 is arranged outside of the first angle range θ1 and within the second angle range θ2, the lever 15 is drivingly coupled to the oscillating disk 7 easily. That is, control of the actuator 3 is not made complicated. By rotating the motor shaft 3a within the first angle range θ1 as normal, the circumferential contact surfaces 7d guide the coupling pin 16 to the coupling bore 7a, and fits the coupling pin 16 into the coupling bore 7a.

The preferred embodiment may be modified as follows.

The first elastic portion 21a and the second elastic portions 21b do not need to be integrated as the elastic member 21. The first elastic portion 21a and the second elastic portions 21b may be separately provided. The first elastic portion 21a and the second elastic portions 21b may be arranged as required as long as they are between the first and second restrictors 13a, 13b of the pivot holder 13 and the lever 15. For example, the first restrictor 13a may be provided with the first elastic portion 21a and one of the second elastic portions 21b, and the second restrictor 13b may be provided with the other second elastic portion 21b. Also, both of the first restrictor 13a and the lever 15 may be provided with the first elastic portion 21a. Both of the first restrictor 13a and the lever 15 may be provided with the second elastic portion 21b.

The elasticity of the first elastic member may be set smaller than the elasticity of the second elastic member by forming the first elastic member and the second elastic members with different materials or with materials having different properties. The hollow portion 21e may be omitted if no problem arises when omitted.

The first elastic portion 21a and the second elastic portions 21b do not need to be arranged along the axial direction of the pivot shaft 12, but may be arranged along the radial direction of the pivot shaft.

Two first elastic portions 21a may be provided, one on each circumferential side of the distal end of the lever 15.

The position correcting portion, which guides the coupling pin 16 to the coupling bore 7a in order to couple the lever 15 to the oscillating disk 7, does not need to be the correction recess 7c.

The correction recess 7c may be omitted as long as the coupling pin 16 is aligned with the coupling bore 7a by separately manipulating an operating switch of the actuator 3.

The structure for coupling the motor shaft 3a to the pivot shaft 12 is not limited to the structure in which the coupling pin 16 is fitted in the coupling bore 7a.

The invention claimed is:

1. A vehicle wiper device for wiping a surface of a hatch window, which is selectively opened and closed with respect to a vehicle body, the hatch window being selectively opened and closed by rotating with respect to the vehicle body, the device comprising:

an actuator mounted on the vehicle body, the actuator including an output shaft, which rotates in a reciprocating manner within a first angle range, the output shaft including a first coupling portion;

a support member mounted on the hatch window;

a pivot shaft supported by the support member to be rotatable with respect to the hatch window, the pivot shaft extending through the hatch window, the pivot shaft including a second coupling portion, the second coupling portion being drivingly coupled to the first coupling portion when the hatch window is closed, the output shaft being arranged coaxially with the pivot shaft, and the rotation of the output shaft within the first angle range rotating the second coupling portion within the first angle range;

a wiper arm supported by the pivot shaft, when the actuator is actuated while the hatch window is closed, the wiper arm oscillates to wipe the surface of the hatch window;

a restrictor for restricting the rotation of the second coupling portion, the restrictor restricting the rotation of the second coupling portion to the outside of the first angle range, and the restrictor restricting the rotation of the second coupling portion to the outside the first angle range at both circumferential ends of the first angle range;

a first elastic member-arranged at least on one of the restrictor and the second coupling portion, wherein, when the hatch window is open, the first elastic member contacts the second coupling portion between the restrictor and the second coupling portion, and as a result, even if a force less than or equal to a first rotation force acts on the second coupling portion, the second coupling portion is restricted from rotating to the outside of the first angle range; and a second elastic member arranged at least on one of the restrictor and the second coupling portion, a second angle range greater than the first angle range is defined, wherein, when the hatch window is open, the second elastic member contacts the second coupling portion between the restrictor and the second coupling portion, so that the rotation of the second coupling portion to the outside of the second angle range is restricted, and the second elastic member restricts the rotation of the second coupling portion by a force greater than the first rotation force.

2. The vehicle wiper device according to claim 1, wherein the first elastic member and the second elastic member are mounted on the second coupling portion.

3. The vehicle wiper device according to claim 1, wherein the first elastic member has a greater elasticity than the second elastic member.

4. The vehicle wiper device according to claim 1, wherein the first elastic member is integrally formed with the second elastic member.

5. The vehicle wiper device according to claim 3, wherein the first elastic member has a hollow portion.

6. The vehicle wiper device according to claim 1, wherein the first elastic member is formed to protrude toward the outside of the first angle range more than the second elastic member, and wherein the first elastic member is formed such that when the second elastic member restricts the rotation of the second coupling portion, the first elastic member retracts toward the second elastic member.

7. The vehicle wiper device according to claim 6, wherein the first elastic member has a hollow portion, and the hollow portion permits the first elastic member to deform such that the first elastic member retracts toward the second elastic member.

8. The vehicle wiper device according to claim 1, wherein the first elastic member and the second elastic member are arranged along the axial direction of the pivot shaft.

9. The vehicle wiper device according to claim 1, wherein one of a pair of ends of the first angle range corresponds to a stop position of the wiper arm, and wherein the first elastic member is provided to restrict movement of the second coupling portion to the outside of the first angle range from the stop position.

10. The vehicle wiper device according to claim 1, further comprising a position correcting portion, wherein, in a state where the second coupling portion is located outside of the first angle range, when the output shaft rotates within the first angle range, the position correcting portion engages with one of the pivot shaft and the second coupling portion, thereby rotating the pivot shaft, and as a result, the second coupling portion is rotated into the first angle range, and the second coupling portion is coupled to the first coupling portion.

11. A vehicle wiper device for wiping a surface of a hatch window, which is selectively opened and closed with respect to a vehicle body, the hatch window being selectively opened and closed by rotating with respect to the vehicle body, the device comprising:

an actuator mounted on the vehicle body, the actuator including an output shaft, which rotates in a reciprocating manner within a first angle range, the output shaft including a first coupling portion;

a support member mounted on the hatch window;

a pivot shaft supported by the support member to be rotatable with respect to the hatch window, the pivot shaft extending through the hatch window, the pivot shaft including a second coupling portion, and the second coupling portion being drivingly coupled to the first coupling portion when the hatch window is closed, the output shaft being arranged coaxially with the pivot shaft, and the rotation of the output shaft within the first angle range rotating the second coupling portion within the first angle range;

a wiper arm supported by the pivot shaft, wherein, when the actuator is actuated while the hatch window is closed, the wiper arm oscillates to wipe the surface of the hatch window;

a restrictor for restricting the rotation of the second coupling portion, the restrictor restricting the rotation of the second coupling portion to the outside of the first angle range, and the restrictor restricting the rotation of the second coupling portion to the outside the first angle range at both circumferential ends of the first angle range;

a first elastic member arranged on the second coupling portion, wherein, when the hatch window is open, the first elastic member contacts the second coupling portion between the restrictor and the second coupling portion, and as a result, even if a force less than or equal to a first rotation force acts on the second coupling portion, the second coupling portion is restricted from rotating to the outside of the first angle range; and a second elastic member arranged on the second coupling portion, a second angle range greater than the first angle range is defined, and wherein, when the hatch window is open, the second elastic member contacts the second coupling portion between the restrictor and the second coupling portion, so that the rotation of the second coupling portion to the outside of the second angle range is restricted, and the second elastic member restricts the rotation of the second coupling portion by a force greater than the first rotation force.

* * * * *